United States Patent [19]

Goebel

[11] 4,409,730
[45] * Oct. 18, 1983

[54] METHOD FOR FABRICATING MULTI-ELEMENT ANODE STRUCTURES FOR ELECTROCHEMICAL CELLS

[75] Inventor: Franz Goebel, Sudbury, Mass.

[73] Assignee: GTE Products Corporation, Stamford, Conn.

[*] Notice: The portion of the term of this patent subsequent to Jan. 18, 2000 has been disclaimed.

[21] Appl. No.: 319,813

[22] Filed: Nov. 9, 1981

[51] Int. Cl.³ .............................................. H01M 4/08
[52] U.S. Cl. .................................. 29/623.5; 429/218; 429/242
[58] Field of Search ........................... 29/623.1, 623.5; 429/196, 218, 234, 239, 241, 242

[56] References Cited

U.S. PATENT DOCUMENTS

| | | | |
|---|---|---|---|
| 3,508,967 | 4/1970 | Lyall et al. | 429/218 |
| 4,020,248 | 4/1977 | Goebel | 429/218 |
| 4,086,397 | 4/1978 | Goebel et al. | 429/237 |
| 4,161,063 | 7/1979 | Goebel et al. | 29/623.5 |
| 4,369,237 | 1/1983 | Goebel | 429/218 |

*Primary Examiner*—Daniel C. Crane
*Attorney, Agent, or Firm*—David M. Keay; Peter Xiarhos

[57] ABSTRACT

Methods for fabricating anode structures for electrochemical cells. An anode structure is fabricated in accordance with a first method of the invention by positioning a first plurality of lithium anode pellets, in the form of round balls, in a spaced-apart pattern adjacent to a first side of an expanded metal screen, pressing the lithium anode pellets into the screen so as to be embedded within the screen, and then repeating the above steps with a second plurality of lithium anode pellets relative to the other side of the screen.

An anode structure is fabricated in accordance with a second method of the invention by executing the steps as described hereinabove and, in addition, embedding into the screen a heat absorbing porous insulative separator material between the lithium anode pellets.

20 Claims, 7 Drawing Figures

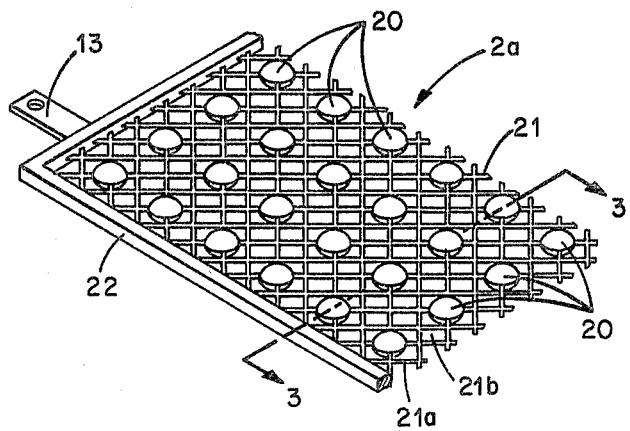
Fig. 2.
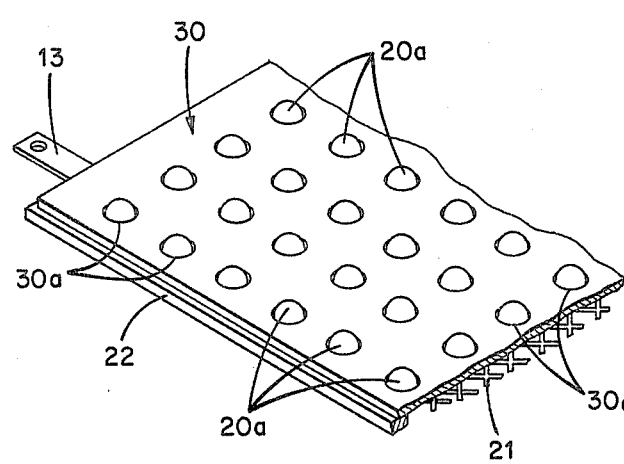
Fig. 3.
Fig. 4.
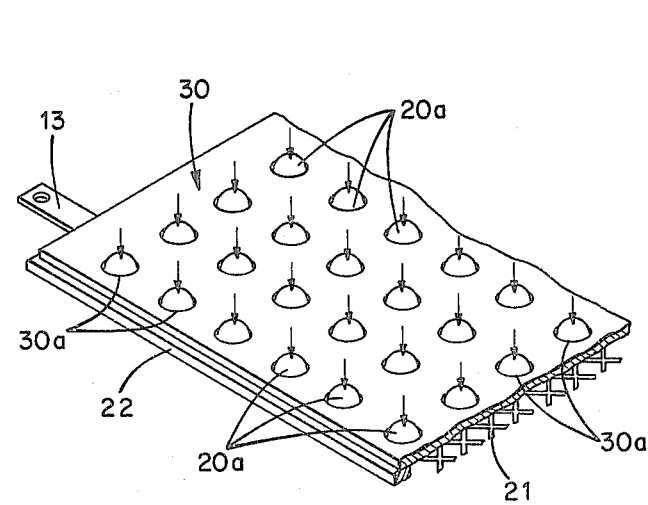
Fig. 5.

METHOD FOR FABRICATING MULTI-ELEMENT ANODE STRUCTURES FOR ELECTROCHEMICAL CELLS

CROSS REFERENCE TO RELATED APPLICATION

In co-pending application Ser. No. 319,812, filed concurrently herewith in the name of Franz Goebel and entitled MULTI-ELEMENT ANODE STRUCTURES FOR ELECTROCHEMICAL CELLS, now U.S. Pat. No. 4,369,237 issued Jan. 18, 1983 there is disclosed and claimed multi-element anode structures for electrochemical cells as fabricated in accordance with techniques disclosed and claimed in the present application.

BACKGROUND OF THE INVENTION

The present invention relates to methods for fabricating anode structures and, more particularly, to methods for fabricating multi-element anode structures for primary electrochemical cells.

Primary electrochemical cells are generally well known and understood by those skilled in the art. One particularly useful primary electrochemical cell, especially for high current drain applications, is a so-called prismatic primary elecrochemical cell. Such a cell is described in detail in U.S. Pat. No. 4,086,397, in the names of Franz Goebel and Nikola Marincic, and includes a battery stack enclosed together with an electrolytic solution within a metal housing. The battery stack as used within the cell comprises a large number of generally rectangular cell components including a plurality of anode structures, carbon cathode current collector electrodes, and insulative separators (e.g., of fiberglass) between the anode structures and the carbon cathode current collector electrodes. Each anode structure generally comprises a large rectangular, flat, single, continuous sheet of an oxidizable alkali metal, such as lithium, physically impressed into a flat supporting expanded metal (e.g., nickel) grid, and each of the carbon cathode current collector electrodes comprises an aggregation of porous, semi-rigid carbon globules or conglomerates physically impressed into a flat expanded metal (e.g., nickel) current collector grid. A common and preferred electrolytic solution employed in the cell as described above is a cathodelectrolyte solution comprising a reducible soluble cathode such as thionyl chloride and an electrolyte solute such as lithium tetrachloroaluminate dissolved in the thionyl chloride.

By the appropriate selection of battery cell components and materials, a cell as described above can be constructed to have any one of several possible sizes and energy configurations. A typical cell, for example, has exterior dimensions of approximately 18 inches (height)×13 inches (width)×10 inches (depth), a weight of 156 pounds, an ampere-hour capacity rating of 10,000 ampere-hours, and a nominal discharge current of 40 amperes.

In an electrochemical cell as described hereinabove, it is possible under certain adverse conditions, for example, in the case of severe physical abuse to the cell, for an internal short circuit condition to develop within the cell between metal parts of a pair of anode and cathode structures. In such a case, a hot spot can develop in the lithium sheet of the anode structure and propagate throughout the sheet. If the sheet temperature is high enough, for example, above 180° C., the lithium metal can melt and react violently with the thionyl chloride, or with components of the discharge reaction such as sulfur, or both, resulting in severe, permanent physical damage to the cell.

BRIEF SUMMARY OF THE INVENTION

In accordance with the present invention, methods are provided for fabricating anode structures for electrochemical cells which result in increased protection of the anode structures against propagation of hot spots in lithium metal when the anode structures are employed in electrochemical cells. In a first method for fabricating an anode structure in accordance with the invention, a plurality of discrete lithium anode pellets are positioned in a spaced-apart pattern adjacent to a metal screen of a predetermined thickness and the pellets are pressed into the screen so as to be embedded within the screen and physically secured thereto. In a second method for fabricating an anode structure in accordance with the invention, the same steps as executed in the above-described first method are performed and, in addition, a porous insulative separator material is pressed into the metal screen between the lithium anode pellets so as to be embedded within the screen and physically secured thereto.

BRIEF DESCRIPTION OF THE DRAWING

Various objects, features and advantages of methods for fabricating anode structures for electrochemical cells in accordance with the present invention will be apparent from a detailed discussion taken in conjunction with the accompanying drawing in which:

FIG. 2 illustrates an anode structure as fabricated in accordance with a first method of the invention;

FIG. 3 is a cross-sectional view, taken along the line 3—3 in FIG. 2, of the anode structure of FIG. 2;

FIGS. 4 and 5 illustrate steps employed in the first method of the invention for fabricating the anode structure of FIG. 2;

DETAILED DESCRIPTION OF THE INVENTION

Figure 1:
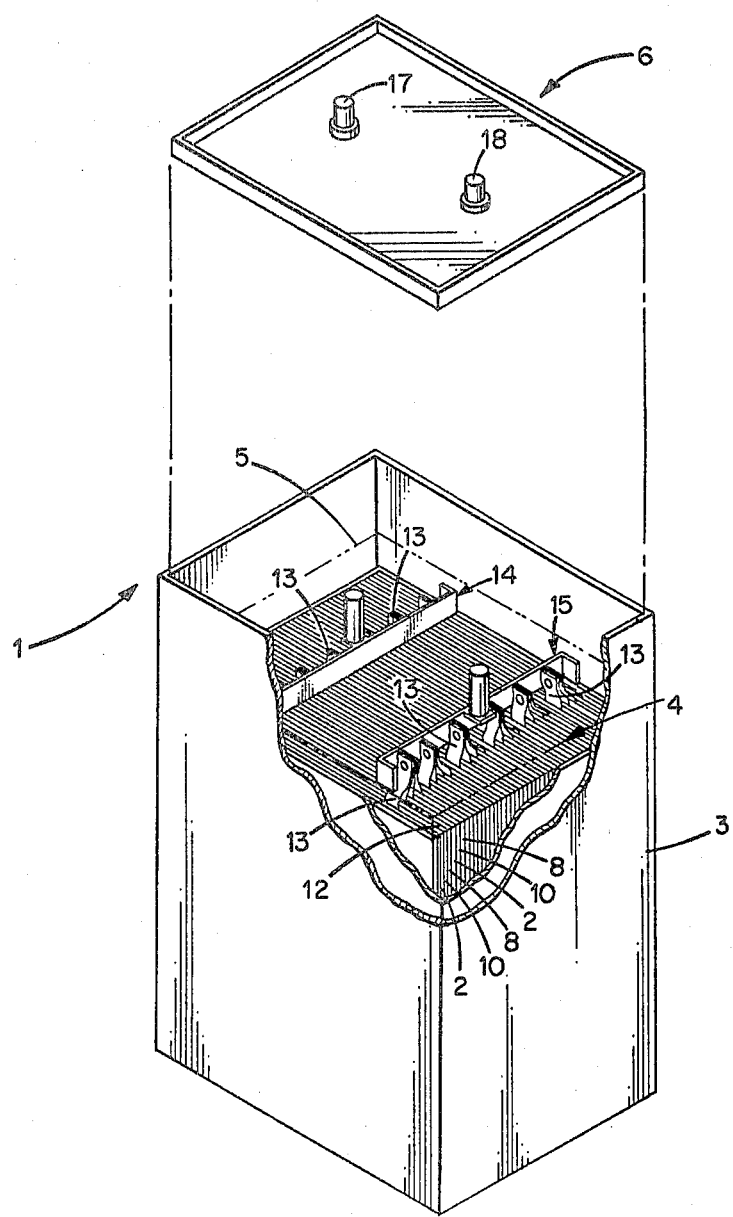
FIG. 1 is a partially exploded perspective view, with parts broken away, of a primary electrochemical cell employing anode structures as fabricated in accordance with methods of the present invention.

Referring now to FIG. 1, there is shown a primary electrochemical cell 1 employing a plurality of anode structures 2 as fabricated in accordance with the methods of the present invention. The electrochemical cell 1, and the electrochemical system therefor, may be constructed in accordance with the teachings of the aforementioned U.S. Pat. No. 4,086,397 and generally includes a rectangular metal housing 3, a battery stack 4 disposed within the housing 3, an electrolytic solution 5 in contact with the battery stack 4, and a top cover assembly 6. The housing 3 may be of stainless steel and have typical outer dimensions of approximately 18 inches (height)×13 inches (width)×10 inches (depth). The battery stack 4 as employed within the housing 3 comprises a plurality of generally-rectangular cell components. These components include, in addition to the aforementioned plurality of anodes 2, a plurality of carbon cathode current collector electrodes 8, and a plurality of insulative separators 10 between the anode structures 2 and the carbon cathode current collector electrodes 8. Although not specifically shown in the drawing, each of the carbon cathode current collector electrodes 8 comprises an aggregation of porous semi-rigid carbon globules or conglomerates pressed into a flat expanded metal (e.g., nickel) grid or screen to be supported thereby. The grids of the electrodes 8 also serve as current collector members for the cell during the discharge of the cell 1. The separators 10, which serve to electrically isolate the anode structures 2 from the carbon cathode current collector electrodes 8, may be of a suitable insulative material such as fiber-glass. The anode structures 2 and the carbon cathode current collector electrodes 8 further have narrow portions or rails 12 at the peripheries thereof from which thin metal rectangular tabs 13 extend upwardly for facilitating the physical and electrical connection of the anode structures 2 and the carbon cathode current collector electrodes 8 to corresponding metal (e.g., nickel) bus bar arrangements 14 and 15, respectively. The bus bar arrangements 14 and 15 are in turn mechanically and electrically connected to a pair of metal (e.g., nickel) terminals 17 and 18, respectively, located in, and insulated from, the top cover assembly 6.

Typical dimensions for the battery stack 4 as described hereinabove, corresponding to a total of 47 anode structures and cathode electrodes, are approximately 14.5 inches (height) × 12.8 inches (width) × 9.8 inches (depth). The electrolytic solution 5 to which the battery stack 4 is exposed and which is compatible with the cell components as described hereinabove is preferably a cathodelectrolyte solution comprising a reducible soluble cathode such as thionyl chloride and an electrolyte solute such as lithium tetrachloroaluminate dissolved in the thionyl chloride.

Each of the anode structures 2 as described briefly hereinabove may take the form as shown at 2a in FIGS. 2 and 3 or at 2b in FIGS. 6 and 7. The anode structure 2a as shown in FIGS. 2 and 3 comprises a plurality of lithium anode elements 20 embedded within, and physically secured to, a flat rectangular metal grid or screen 21 in a spaced-apart, equi-distant row and column format. As shown in FIGS. 2 and 3, each of the lithium anode elements 20 has a generally cylindrical overall configuration and a generally circular cross section, although many other shapes are possible, e.g., square, rectangular, oval, etc. In addition, a variety of patterns or layouts other than a row and column pattern may be used.

The lithium anode elements 20 as shown in FIGS. 2 and 3 are selected to have physical dimensions and spacings therebetween such that any hot spot which might occur in any one of the elements 20, for example, as a result of an internal short circuit condition within the associated cell, does not propagate or spread to the other lithium elements 20 and result in melting of the elements 20 and consequential violent reaction with other components or discharge reaction products within the cell. In the particular embodiment of the anode structure shown in FIGS. 2 and 3, the spaces between the lithium anode elements 20 are occupied by the electrolytic solution when the anode structure is actually in place within the cell.

The grid or screen 21 within which the lithium anode elements 20 are embedded is surrounded by a metal (e.g., nickel) frame 22 with an associated tab 13 and may take the form of an expanded metal (e.g., nickel) substrate having multiple portions 21a defining a large number of openings 21b therein. The lithium anode elements 20, which are softer than the material (nickel) of the screen 21, are pressed into the portions 21a and openings 21b of the screen 21 in a spaced-apart fashion. The anode elements 20 as employed with such a screen may have a typical diameter of ¼ inch and a thickness of 0.040 inch. The particular spacing between the elements 20 depends on the ability of the elements to absorb heat and not transfer the heat to adjacent anode elements. A typical spacing for the elements 20 having the above-specified dimensions is ⅛ inch. A typical thickness for the screen 21 is 0.005 inch.

A preferred method by which the anode structure 2a as described hereinabove can be fabricated is generally indicated in FIGS. 4 and 5. As shown in FIG. 4, a locating frame 30 having a plurality of spaced circular openings 30a therein corresponding to the desired location and spacing, that is, pattern or layout, for the lithium anode elements 20 relative to the screen 21 is superimposed over the screen 21 and a plurality of lithium pellets in the form of small, round balls 20a are placed within the openings 30a so as to rest on the top surface of the screen 21. The balls 20a are then pressed, as generally indicated schematically in FIG. 5, into the screen 21 by any suitable apparatus (not shown) so that the balls 20a enter about halfway into the screen 21. The balls 20a tend to flatten and expand outwardly as they are pressed into the metal portions 21a and openings 21b in the screen 21. Once the lithium balls 20a have been pressed into and embedded within the screen 21 as described hereinabove, the screen 21 is turned over and the above steps are repeated on the other side of the screen 21, using additional lithium balls 20a which are pressed into the other side of the screen 21 in alignment with, and in physical contact with, the balls 20a embedded into the first side of the screen 21. Each pair of aligned, compressed balls in the final state has a generally cylindrical shape and results in a more or less unitary lithium element 20 as shown in FIGS. 2 and 3 having a generally circular cross section.

As a variation of the above method, it will be appreciated that if the screen 21 is placed in a vertical (rather than horizontal) orientation, it is possible to position a pair of locating frames (such as that shown at 30 in FIG. 4) relative to opposing sides of the screen 21 and embed two sets or patterns of lithium balls into the screen, either in successive or simultaneous pressing operations.

Figure 6:
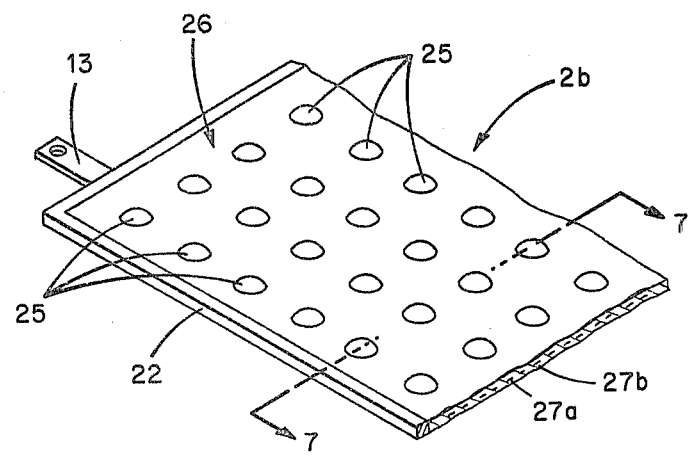
FIG. 6 illustrates an anode structure as fabricated in accordance with a second method of the invention.
Figure 7:
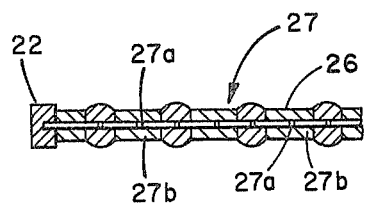
FIG. 7 is a cross-sectional view, taken along the line 7—7 in FIG. 6, of the anode structure of FIG. 6.

The aforementioned anode structure 2b as shown in FIGS. 6 and 7 is similar to that shown at 2a in FIGS. 2 and 3 with the exception that the lithium anode elements of the anode structure 2b, shown at 25 in FIGS. 6 and 7, have a porous insulative material 26 physically interposed between the lithium anode elements 25. Both the anode elements 25 and the material 26 are pressed within metal portions 27a and openings 27b in an expanded metal (e.g., nickel) screen 27 (FIG. 7). The insulative material 26 may take the form of a fiberglass powder, a silicate, alumina, or mixtures thereof, or any other suitable insulative separator material, either alone or together with a suitable binder such as "Halar" (ethylene chlorofluoroethylene, or ECFE) in low concentration. The size and spacing of the lithium anode elements 25 in this case depends on the ability of the anode elements 25 and the separator material 26 to absorb heat. The anode elements 25 are formed in the screen 27 in the same manner as previously described in connection with the fabrication of the anode structure 2a. The separator material 26 is pressed into the grid or screen 27 in any suitable manner, for example, by rolling the material across and into the screen 27, preferably from both sides. Since the separator material 26 is porous in nature, any covering of the lithium anode elements 25 by the separator material 26 is not harmful since the electrolytic solution in the associated cell is able to penetrate the separator material 26 and make contact with the anode elements 25.

The above-described anode structures 2a and 2b are also disclosed, and claimed, in the aforementioned U.S. Pat. No. 4,369,237.

While there has been described what are considered to be preferred methods of the invention, it will be obvious to those skilled in the art that various changes and modifications may be made therein without departing from the invention as called for in the appended claims.

What is claimed is:

1. A method for fabricating an anode structure for an electrochemical cell comprising the steps of:
    positioning a plurality of discrete lithium anode pellets in a spaced-apart pattern adjacent to a metal screen of a predetermined thickness; and
    pressing the plurality of lithium anode pellets into the metal screen so as to be embedded within the screen and physically secured thereto.

2. A method for fabricating an anode structure in accordance with claim 1 wherein:
    the metal screen has interconnected portions defining a plurality of openings in the screen; and
    the lithium anode pellets are embedded within the screen by way of the interconnected portions and openings in the screen.

3. A method for fabricating an anode structure in accordance with claim 2 wherein:
    the metal screen is an expanded metal screen.

4. A method for fabricating an anode structure in accordance with claim 3 wherein:
    the plurality of lithium anode pellets pressed into the metal screen are arranged adjacent to the metal screen in a pattern of rows and columns.

5. A method for fabricating an anode structure in accordance with claim 2 wherein:
    the lithium anode pellets as pressed into the metal screen are in the form of balls prior to being pressed into the screen.

6. A method for fabricating an anode structure in accordance with claim 1 further comprising the step of:
    pressing an insulative separator material into the metal screen between the lithium anode pellets so as to be embedded within the screen and physically secured thereto.

7. A method for fabricating an anode structure in accordance with claim 6 wherein:
    the lithium anode pellets pressed into the metal screen are in the form of balls prior to being pressed into the screen;
    the metal screen is an expanded metal screen having interconnected portions defining a plurality of openings; and
    the lithium anode pellets and the insulative separator material are embedded within the screen by way of the interconnected portions and openings in the screen.

8. A method for fabricating an anode structure for an electrochemical cell comprising the steps of:
    positioning a first plurality of lithium anode pellets in a spaced-apart relationship adjacent to a first side of a metal screen of a predetermined thickness;
    pressing the first plurality of lithium pellets into the metal screen so that the pellets are embedded within the metal screen and physically secured thereto;
    positioning a second plurality of lithium anode pellets in a spaced-apart relationship adjacent to a second side of the metal screen; and
    pressing the second plurality of lithium pellets into the metal screen so that the pellets are embedded within the metal screen and physically secured thereto.

9. A method for fabricating an anode structure in accordance with claim 8 wherein:
    the second plurality of lithium anode pellets are positioned in alignment with the first plurality of lithium anode pellets prior to pressing the second plurality of lithium anode pellets into the metal screen; and
    the second plurality of lithium anode pellets are pressed into the metal screen by an amount to make physical contact with the corresponding ones of the first plurality of lithium anode pellets thereby to form generally unitary pellets together with the first plurality of pellets.

10. A method for fabricating an anode structure in accordance with claim 9 wherein:
    the first and second pluralities of lithium anode pellets pressed into the metal screen are in the form of balls prior to being pressed into the screen;
    the metal screen is an expanded metal screen having interconnected portions defining a plurality of openings; and
    the first and second pluralities of lithium anode pellets are embedded within the screen by way of the interconnected portions and openings in the screen.

11. A method for fabricating an anode structure in accordance with claim 10 wherein:
    the first and second pluralities of lithium pellets are arranged adjacent to the respective sides of the metal screen in patterns of rows and columns.

12. A method for fabricating an anode structure in accordance with claim 8 further comprising the step of:
    pressing an insulative separator material into the metal screen between the lithium anode pellets so as to be embedded within the screen and physically secured thereto.

13. A method for fabricating an anode structure in accordance with claim 12 wherein:
    the first and second pluralities of lithium anode pellets pressed into the metal screen are in the form of balls prior to being pressed into the metal screen;
    the metal screen is an expanded metal screen having interconnected portions defining a plurality of openings; and
    the first and second pluralities of lithium anode pellets and the insulative separator material are embedded within the screen by way of the interconnected portions and openings in the screen.

14. A method for fabricating an anode structure in accordance with claim 13 wherein:
    the second plurality of lithium anode pellets are positioned in alignment with the first plurality of lithium anode pellets prior to pressing the second plurality of lithium anode pellets into the metal screen; and the second plurality of lithium anode pellets are pressed into the metal screen by an amount to make physical contact with the corresponding ones of the first plurality of lithium anode pellets thereby to form generally unitary pellets together with the first plurality of pellets.

15. A method for fabricating an anode structure for an electrochemical cell comprising the steps of:
   positioning first and second pluralities of lithium pellets relative to opposite sides of a metal screen of a predetermined thickness; and
   pressing the first and second pluralities of lithium pellets into the metal so that the pellets are embedded within the metal screen and physically secured thereto.

16. A method for fabricating an anode structure in accordance with claim 15 wherein:
   the first and second pluralities of lithium anode pellets are positioned in alignment with each other; and
   the first and second pluralities of lithium anode pellets are pressed into the metal screen by amounts to make physical contact with each other thereby to form generally unitary pellets together with the first plurality of pellets.

17. A method for fabricating an anode structure in accordance with claim 16 wherein:
   the first and second pluralities of lithium anode pellets pressed into the metal screen are in the form of balls prior to being pressed into the metal screen;
   the metal screen is an expanded metal screen having interconnected portions defining a plurality of openings; and
   the first and second pluralities of lithium anode pellets are embedded within the screen by way of the interconnected portions and openings in the screen.

18. A method for fabricating an anode structure in accordance with claim 17 wherein:
   the first and second pluralities of lithium pellets are arranged adjacent to the respective sides of the metal screen in patterns of rows and columns.

19. A method for fabricating an anode structure in accordance with claim 18 further comprising the step of:
   pressing an insulative separator material into the metal screen between the lithium anode pellets so as to be embedded within the screen and physically secured thereto.

20. A method for fabricating an anode structure in accordance with claim 19 wherein:
   the first and second pluralities of lithium anode pellets pressed into the metal screen are in the form of balls prior to being pressed into the metal screen;
   the metal screen is an expanded metal screen having interconnected portions defining a plurality of openings; and
   the first and second pluralities of lithium anode pellets and the insulative separator material are embedded within the screen by way of the interconnected portions and openings in the screen.

* * * * *